United States Patent Office 2,858,256
Patented Oct. 28, 1958

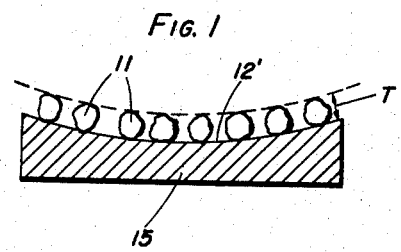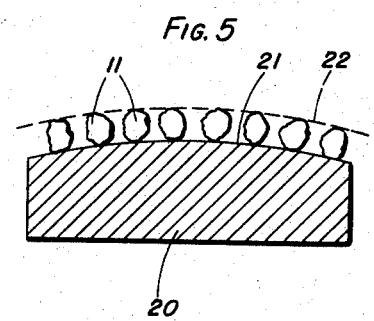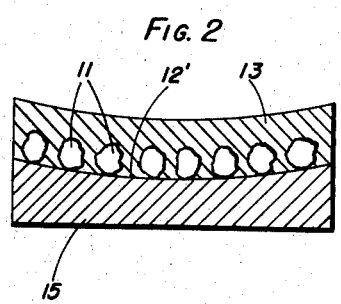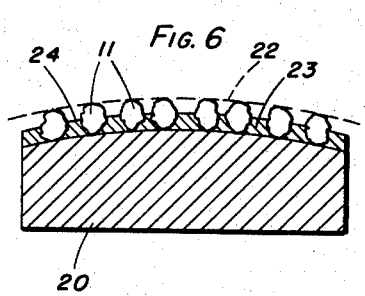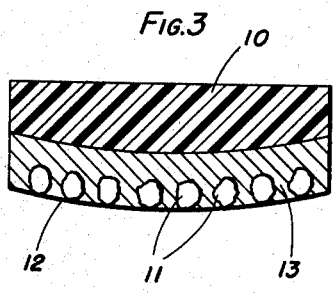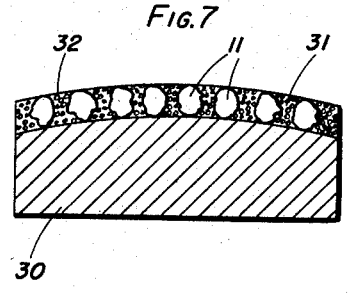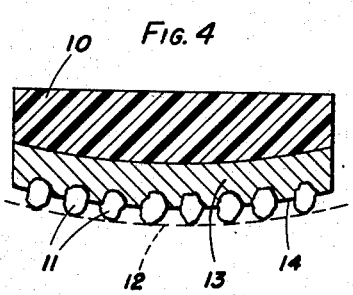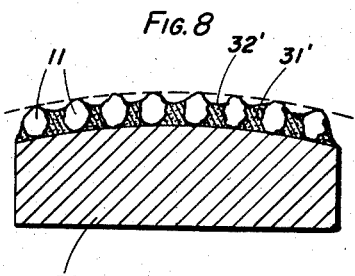
INVENTORS
FREDERICK FAHNOE
JAMES J. SHYNE
ATTORNEYS

2,858,256

ELECTROPHORETIC METHOD OF MAKING AN ABRASIVE ARTICLE AND ARTICLE MADE THEREBY

Frederick Fahnoe, Morristown, and James J. Shyne, Arlington, N. J., assignors to Vitro Corporation of America, New York, N. Y., a corporation of Delaware Application October 26, 1953, Serial No. 388,119

19 Claims. (Cl. 204—4)

Our invention relates to precision-dimensioned abrasive laps and dies and the like articles, and to methods for fabricating the same.

The abrasive art has advanced to a point at which satisfactory abrasive materials are available for most applications. However, before such materials can be used, it is necessary to bond the abrasive to a supporting surface or substrate. There are six conventional bonds now available: silicate, vitrified, shellac, rubber, resinoid and metallic bonding. Each of these possesses inherent disadvantages. For example, the silicate, vitrified, and shellac bonds must be fired or baked at high temperatures for extended periods and are subject to failure under continued high thermal stresses; the resinoid bond will likewise fail under such stresses and also requires a three-day curing period before use; the rubber bond must be vulcanized and reworked between heavy rollers and will decompose under high temperatures; the metallic bond must be formed from metallic powders by sintering under high pressure and temperature.

Moreover, bonding methods heretofore employed for the fabrication of abrasive laps have accepted limitations which reduce the ultimate precision to which such dies may otherwise be applicable. These prior methods have been limited by the degree to which particle-size classification may be controlled, by the inherent inability to develop a uniform application of grit over the grinding surface, and by inherent inabilities to maintain the outer grinding portions of each grit particle in a desired single grinding surface.

Accordingly, it is an object of the present invention to provide new types of metal bonding which obviates the above disadvantages.

It is a further object of the invention to provide improved grinding laps and methods of making the same.

Another object is to provide improved lap-fabricating methods whereby an abrasive-particle size may be closely controlled.

A further object is to provide improved lap-fabricating methods, whereby abrasive-particle distribution over the grinding surface may be closely controlled.

Yet a further object is to provide improved lap-fabricating methods which can be carried out without the application of heat.

Still another object is to provide improved lap-fabricating methods which are readily adaptable to a sequence of repetitive fabricating operations.

Another object is to provide improved means for supporting abrasive particles in laps or dies of the character indicated.

It is also an object to provide an improved abrasive-die construction lending itself to precision servicing, that is, to the reapplication of a grinding surface of desired precision contour.

Still another object is to provide certain specific abrasive-lap configurations of bonding agent with respect to abrasive particles.

Other objects and various further features of novelty and invention will be pointed out or will occur to those skilled in the art from a reading of the following specification, in conjunction with the accompanying drawings. In said drawings, which show, for illustrative purposes only, preferred lap constructions and methods incorporating features of the invention:

Figures 1 to 4 are simplified enlarged cross-sectional views illustrating successive steps in the fabrication of the lap of Figure 4;

Figures 5 and 6 are similar views illustrating an alternative method; and

Figures 7 and 8 are further similar views illustrating a further alternative method.

Briefly stated, our invention contemplates the electrophoretic deposition of abrasive material, and the supporting of abrasive grit thus deposited by rugged and solid bonding, extending virtually to the grinding surface. The bonding layer may be applied through code position or by electrolytic or electroless deposition, and placement of the limiting surface of the bonding material (with respect to the grinding surface determined by the outer limits of the grit particles) may be controlled by localized electrolytic or other etching of the bonding material from grinding particles otherwise fully suspended in bonding material, or by shrinking the bonding material (as in a chemical reduction), or by merely plating to a bonding or supporting depth at least no greater than the depth or thickness of the abrasive material.

Electrophoretic deposition occurs when an electrostatic field is established between two electrodes immersed within a colloidal or gross dispersion of charged particles, thus causing the migration of the particles comprising the suspended phase toward one of the electrodes and producing the deposit of an adherent coating on that electrode. Exceptional uniformity of coating thickness and compacting (with an attendant relatively high coating density) are obtained, as compared with dipping, spraying, brushing, and other more conventional methods of application. Irregularly shaped objects can be coated with excellent uniformity and reproducibility of coating.

The deposition itself can be precisely controlled through close control of the main parameters of the electrophoretic process; i. e., the voltage applied between the electrodes, the relative spacing of the electrodes, the duration of the process and the dispersion concentration. Although this precise control can only be obtained within certain parameter ranges described in more detail in our copending application, Serial No. 386,882, filed October 19, 1953, in general the rate of deposition increases both with increased voltage and increased dispersion concentration and decreases with increased electrode spacing; the amount of deposition increases as the period of deposition is increased.

In our processes, the liquid phase which is the carrier for the charged particles in the electrophoretic deposition, must be a relatively anhydrous, non-conductive fluid. By a relatively non-conductive fluid we mean a fluid having a conductivity falling within the range of $10^{-5}$ to $10^{-9}$ ohm-cm., and preferably falling within the range of $10^{-6}$ to $10^{-8}$ ohm-cm. Examples of this type of fluid are: alcohols such as methyl, ethyl and isopropyl alcohols; ketones such as acetone; esters such as ethyl acetate; and aromatics such as nitrobenzene.

The coating formed by the deposition can be composed of any abrasive material which is capable of being colloidally dispersed. For example, any natural abrasive such as diamond, Carborundum, emery, garnet and the like, or any manufactured abrasive such as carbides, fused alumina and various metallic compounds, or mixtures of these abrasives can be so dispersed. The colloidal dispersion need not be stable as long as the charged particles can be retained in dispersion through forced agitation or by the use of peptizing agents; such particles may have diameters falling within the range 1/100 to 100 microns.

The base material which receives the electrophoretic deposition (which is often referred to as substrate) must be a material which either inherently possesses electron-conduction bands (i. e., ferrous and non-ferrous metals and associated alloys), or which is capable under certain conditions of obtaining electron-conduction bands (i. e., semiconductors). However, a hard durable metal such as steel is generally preferred in the abrasive art.

In one version of our method, the abrasive and bonding materials are codeposited. In this situation, the coating and base materials must be of the type previously indicated; the bond material must be a metal compound which after decomposition and reduction forms a metal binder. Such compounds, for example, can be: metal oxides such as chromium oxide; metal carbonates such as nickel carbonate; metal sulfates such as copper sulfate; metal halides such as cobalt chloride.

The bond is formed at the common surface between the binder and the base material through extensive diffusion of each material into the other.

When electrolytic deposition is employed as in another version of our method, the bonding material must be a metal or alloy which is capable of being electrolytically deposited; for example, chromium, nickel or cobalt. In this situation, the bond is formed through mechanical meshing of the bonding and base materials at their common surface.

When "electroless" deposition is employed, the bonding material must be chosen from a small class of metal compounds which are capable of being reduced to metal on the surface of the base material in the presence of a catalyst and without the application of heat; examples of this class are cobalt and nickel. The bond formed by "electroless" deposition is similar to that formed by the co-deposition process; i. e., diffusion of the base and bonding materials into each other at their common surface.

Referring to Figures 1 to 4 of the drawings, our invention is shown in application to a method for forming the abrasive lap of Figure 4. This lap can comprise a supporting body 10 which can be of plastic, and a plurality of abrasive particles 11 can be distributed uniformly and with relatively uniform particle-size classification over an abrasive surface represented by the outer projecting limits of the individual particles; this outer surface is designated generally by the dashed line 12 in Figure 4. The abrasive particles 11 can be supported in a solid body of metal 13, such as nickel or chromium, and the supporting body can largely comprise a solid homogeneous layer uniformly backing up all abrasive particles and extending in full intimate surrounding contact with the back and sides of all abrasive particles. The outer limit (designated generally at 14 in Fig. 4) of the supporting metal is preferably at least no further extended than the grinding surface 12, and if the supporting metal is substantially softer than the abrasive particles 11, then it may be perfectly feasible initially to provide the supporting metal substantially at the abrasive surface 12, allowing for wear in use to accomplish the desired local recessing of the binding material. However, in the form shown, we illustrate our preference for an initially formed slight recessing of the supporting metal from the abrasive surface 12.

In forming the die of Fig. 4, the first step (see Fig. 1) can comprise the electrophoretic deposition of a uniform layer of particles 11 over the precision-formed surface 12′ of a master 15. The master 15 may be of glass, as in the case of preparing a spherical lens-grinding lap, in which case we prefer first to apply a flash coating of conductive material, such as metallic silver, to the surface 12′; however, in the form shown, and as suggested by the cross-hatching, the master 15 is of metal. Because the particle-size classification may be kept relatively uniform by methods to be described in conjunction with the specific example given below, the particles 11 will be deposited to a uniform thickness designated generally T in Fig. 1.

After electrophoretically depositing the abrasive layer, we prefer to dry the layer in order to permit the layer to become somewhat more rigid and also to adhere somewhat more firmly to surface 12′. Thereafter, solid bonding metal 13 may be applied by electrolytic deposition (Fig. 2). Because the master surface 12′ is conductive regardless of the nature of the master 15, this bonding metal will be drawn through the pores and interstices in the deposited layer of abrasive material to the surface 12′ and then will build up therein. By carrying the plating further, the solid homogeneous backing described in connection with Fig. 4 may be built up to the desired thickness. In order to reinforce the foil thus developed, the solid backing or body 10 of plastic, metal, or any other desired material, may be applied to the exposed surface of supporting metal 13, and when this bond has been completed, the master 15 may be stripped from the built-up foil and body, so that the lap can then have the appearance shown in Fig. 3. As explained above, if the supporting metal 13 is sufficiently softer than the abrasive grit 11, no further steps may be necessary to complete the lap construction. However, as indicated above, we prefer that the supporting metal 13 shall be slightly recessed from the grinding surface 12; and this recessing can be accomplished by controlled electrolytic or chemical etching of the bonding metal.

In Figs. 5 and 6, we illustrate an alternative method for fabricating a precision-dimensioned abrasive lap. According to the method of Figs. 5 and 6, the abrasive particles 11 are electrophoretically deposited initially and permanently on the body of the lap, and complete reliance is placed on the uniformity of particle distribution over the outer surface 21 of body 20 in order to define the precision-grinding contour indicated by the dashed line 22. After the electrophoretically deposited layer has been allowed to dry in the manner indicated generally above, bonding metal may be applied directly, as by electroplating nickel to the body 20 and between the particles 11, thus defining a bonding layer 23 of outer extent 24 preferably short of the grinding contour 22.

In Figs. 7 and 8, we illustrate a still further alternative method which may employ the electrophoretic co-deposition not only of the grinding particles 11 but also of metal compound particles such as nickel oxide, designated generally at 31. These metal compound particles are capable of being decomposed and reduced to metal in a subsequent operation. In this example these particles are formed from a metal oxide such as nickel oxide. It is the nature of the electrophoretic process that codeposited mixtures will develop to a uniform thickness and dispersion; therefore, the deposited layer will involve a uniform spread of the grinding particles 11, as indicated in the drawings.

The codeposited layer of Fig. 7 may be coagulated or allowed to take a set, as by the methods indicated above. Thereafter, by subjecting the coated body 30 to a reducing atmosphere, as by firing in the presence of hydrogen and at a temperature appropriate to the bonding oxide, the oxide can be reduced to solid metal without affecting the grit particles 11; of course, if the grit is a metal oxide, then it should be one which will not reduce to metal under the conditions which will reduce the bonding oxide to bonding metal. In the reduction to metal, some shrinkage may take place, so that the resulting configuration will be as depicted in Fig. 8, in which 31′ designates the solid metal obtained by reduction, and 32′ designates the recessing between individual grinding points occasioned by shrinkage during reduction.

Figs. 7 and 8 will be understood also to illustrate other bonding techniques, as for example that known as electroless plating which is described hereinafter in more detail.

A more complete description of the electrophoretic and bonding techniques will be found in our said copending patent application.

In order better to illustrate our new technique, we shall describe several specific lap preparations.

EXAMPLE I

Silicon carbide (SiC) with an initial particle-size classification of 320 mesh, was submitted to the continuous ball-milling in solution of isopropyl alcohol ($C_3H_7OH$) in a stainless steel ball mill, for a period of twenty-four hours. This operation assured uniformity of particle size and also established an electrostatic charge characteristic of the material being ball-milled. After ball-milling, the dispersion was diluted to a 3 to 5 percent concentration for coating purposes. The diluted dispersion was then subjected to an electrostatic field in a manner more particularly described in said copending patent application.

In the electrophoretic coating bath, the backing plate or base 15 was of stainless steel, and was made either the anode or the cathode, depending upon the charge developed on the particles of abrasive material. The anode-cathode separation was adjusted to 4 cm. A potential of one thousand volts D. C. was applied across the electrodes for 20 seconds, and the electrophoretic deposition was stopped at this point. The coated base was then removed, dipped in isopropyl alcohol, and dried at 40° C. for one hour.

Having completed the electrophoretic deposit, a nickel binder was applied by submerging the set coated base 15 in a nickel electroplating bath and a Watts-type nickel-plating operation performed; the current density was increased from 5 to 10 amps./ft.$^2$ during the plating operation. The increasing current density served to bond the plated metal under tension, and nickel-plating thicknesses of 0.001 inch to 0.003 inch were deposited on the abrasive; since the abrasive-particle size was of the order of 0.0015 inch, this range of plating thicknesses would either be short of covering, or would completely cover, the abrasive particles, depending upon whether the method of Figs. 1 to 4 or the method of Figs. 5 and 6 was being employed. Subsequent cross-sectional examination of the bonded foils developed in this manner conclusively established that the nickel ions must have diffused through the pores of the electrophoretically deposited layer, completely enclosing the particles and leaving no voids.

The experiment was repeated with the same results with different materials and different conditions as outlined in Tables I and II. Table I relates to the electrophoretic deposition of these materials; Table II relates to the electrolytic deposition of the bonding metal.

EXAMPLE II

A mixture comprising 25 percent aluminum oxide ($Al_2O_3$) and 75 percent nickel oxide (NiO) was ball-milled in a solution of isopropyl alcohol ($C_3H_7OH$) to produce particles whose maximum diameters were on the order of 1 micron. The solution was then diluted to a 2 percent concentration and then subjected to an electrostatic field in the manner referred to in Example I. The electrode spacing was adjusted to 3 cm., and a direct-current potential of 100 volts was applied between the electrodes for a period of 10 seconds. Through electrophoretic action, both $Al_2O_3$ and NiO were codeposited on the steel backing plate to a depth of 10 microns.

The coated plate was then removed from the bath and heated to 800° C. for a period of 10 minutes in an atmosphere of anhydrous hydrogen. Subsequent cross-sectional examination revealed that the NiO had been reduced to Ni and that a secure and non-porous bond had been formed.

This experiment was repeated with the same results with different mixtures and different conditions as outlined in Table III.

*Table I*

| Coating Material | Particle size (microns) | Dispersing Medium | Dispersion Concentration, percent | Electrode Spacing (cm.) | Time of Deposition (sec.) | Coating Thickness (microns) | Substrate | Applied Potential (volts) |
|---|---|---|---|---|---|---|---|---|
| SiC | <5.0 | $C_3H_7OH$ | 2 | 4 | 30 | 25 | Stainless Steel | 500 |
| $Al_2O_3$ | <25 | $C_3H_7OH$ | 2 | 4 | 30 | 40 | ___do___ | 100 |
| $Al_2O_3$ | <25 | $(CH_3)_2CO$ | 2 | 4 | 60 | 30 | ___do___ | 100 |
| WC | <40 | $C_3H_7OH$ | 2 | 4 | 60 | 100 | ___do___ | 500 |
| $B_4C$ | <40 | $C_3H_7OH$ | 2 | 4 | 60 | 100 | ___do___ | 500 |

*Table II*

| Coating Material | Substrate | Bath Composition | Current Density (amps./ft.$^2$) | Bonding Material |
|---|---|---|---|---|
| $Al_2O_3$ | Stainless Steel | $NiCl_2+H_3BO_3$ | 10 | Ni |
| WC | ___do___ | $NiCl_2+H_3BO_3$ | 10 | Ni |
| $B_4C$ | ___do___ | $NiCl_2+H_3BO_3$ | 10 | Ni |

*Table III*

| Coating Composition | Particle size (microns) | Dispersing Medium | Dispersion Concentration, percent | Electrode Spacing (cm.) | Time of Deposition (sec.) | Substrate | Bonding Material | Reduc. Temp. (° C.) | Coating Thickness (microns) | Applied Potential (volts) |
|---|---|---|---|---|---|---|---|---|---|---|
| 10% $MoSi_2$ / 90% NiO | <10.0 | $C_3H_7OH$ | 1 | 3 | 10 | Stainless Steel | Ni | 800 | 20 | 200 |
| 10% $Al_2O_3$ / 90% NiO | <1.0 | $C_3H_7OH$ | 2.0 | 3 | 5 | ___do___ | Ni | 800 | 10 | 100 |

EXAMPLE III

One surface of a steel plate was electrophoretically coated with a 40-micron layer of $Al_2O_3$ in the manner previously described. The coated plate was then immersed in a solution of nickel hypophosphite $$Ni(H_2PO_2)_2$$

for a period of one hour at ambient room temperature and pressure. The catalytic action of the $Al_2O_3$ on the solution caused Ni to precipitate out of solution and deposit within the pores of the $Al_2O_3$ coating to establish a secure and non-porous Ni bond.

Other examples within the scope and sphere of the invention will be apparent to those skilled in the art, so that the materials and conditions described in the foregoing examples are not to be considered as ultimate limitations of the present invention.

It will be appreciated that we have described relatively simple procedures for the preparation of precision-dimensioned abrasive laps. By employing our methods, abrasive-particle size and abrasive-particle distribution over the grinding surface may be closely controlled. The distributed particles may be securely bonded in solid metal without voids, and by electrolytic stripping or other processing it will be appreciated that the base or body for the lap may be cleaned for resurfacing to precisely the same grinding contour as originally prepared. The extremely thin nature of the grinding layer need, therefore, constitute no disadvantage, because a worn grinding surface may be reconditioned with relative ease and with no loss of control of precision.

While we have described our invention in detail for the preferred forms and methods illustrated, it will be understood that modifications may be made within the scope of the invention as defined in the claims which follow.

We claim:

1. The method of fabricating a precision-dimensioned abrasive article from a master that is contoured exactly in accordance with the contour of the desired grinding surface, which comprises electrophoretically depositing abrasive particles immediately adjacent and upon the contoured surface of said master, there being pores between particles, then bonding the deposited particles to each other, with bonding material between the abrasive particles and in said pores, and then stripping the bonded particles from said master.

2. The method of claim 1, and including the further and subsequent step of rceessing the limit of bonding material away from the grinding surface in which the grinding portions of said particles have been positioned by bonding.

3. The method of claim 2, in which the bonding material is a metal and in which recessing is accomplished by etching.

4. The method of claim 2, in which the bonding material is a metal oxide codeposited with said abrasive material and reduced to metal by firing in a reducing atmosphere, whereby the volume of the bonding agent relatively to that of the abrasive material may shrink during reduction to metal and thereby effectively recess the outer limit of the bonding material relatively to the grinding surface.

5. The method of fabricating a precision-dimensioned abrasive article utilizing a precision-dimensioned master, whch comprises electrophoretically depositing a relatively thin porous layer of abrasive particles on said master, electroplating said master through the pores between said deposited particles, whereby said particles are intimately surrounded and supported by electroplated material, stripping the electroplated and bonded particles from said master, and etching the exposed stripped surface.

6. The method of fabricating a precision-dimensioned abrasive article, which comprises electrophoretically depositing a relatively thin porous layer of abrasive particles on a desired contour, and electroplating through the pores of the deposited layer to a plated thickness within the deposited layer less than the thickness of the deposited layer.

7. The method of forming an abrasive lens-grinding lap from a body having a desired master contour, which comprises applying a thin conductive coating to said contour, electrophoretically applying a porous layer of abrasive material to said conductive coating, electroplating said conductive coating through the pores of the deposited material to an extent at least as great as the thickness of the electrophoretically deposited material, applying to the resulting bonded foil a body of supporting material, stripping the supported and bonded foil from the master, and electrolytically etching away the conductive layer and a relatively small part of the bonding material.

8. The method of fabricating a precision-dimensioned abrasive article, which comprises electrophoretically depositing a porous layer of abrasive particles, said deposit being made over a desired abrading contour, and bonding the deposited abrasive particles to each other by flooding the pores of the deposited layer in a metallic-salt solution for which the abrasive material serves as a catalyst for reduction of the metal ions to metal.

9. The method of claim 8, in which the abrasive particles are of aluminum oxide, and in which the solution includes a substantial proportion of nickel hypophosphite.

10. The method of fabricating a precision-dimensioned abrasive article from a master that is contoured exactly in accordance with the contour of the desired grinding surface, which comprises electrophoretically depositing abrasive particles immediately adjacent and upon the contoured surface of said master, and with a thickness establishing a porous deposited layer, bonding the deposited particles to each other in the pores of said layer, applying a relatively rigid backing in intimately bonded relation to the layer of bonded particles, and stripping the backed and bonded particles from said master.

11. A method for fabricating a precision-dimensioned abrasive article which comprises providing an anhydrous organic non-conductive solution containing a substantially uniform dispersion of electrically charged abrasive particles, immersing a pair of electrodes in said solution, the surface of one of said electrodes being adapted to receive a deposit of said particles thereon, establishing an electrostatic field between said immersed electrodes thereby causing said charged particles to migrate electrophoretically through said non-conductive solution to said adapted electrode surface to form an adherent layer of said particles thereon characterized by a porous structure extending to the bottom of said deposited layer, and bonding said particles to each other and to said electrode surface by depositing within said pores and to said electrode surface a bonding metal, the bonding thickness of which being less than the overall thickness of the deposit, whereby said layer of particles is firmly anchored to the electrode surface and projects externally therefrom for abrasive action.

12. A method for fabricating a precision-dimensioned abrasive article which comprises providing an anhydrous organic non-conductive solution containing a substantially uniform dispersion of electrically charged abrasive particles, immersing a pair of electrodes in said solution, the surface of one of said electrodes being adapted to receive a deposit of said particles thereon, establishing an electrostatic field between said immersed electrodes thereby causing said charged particles to migrate electrophoretically through said non-conductive solution to said adapted electrode surface to form an adherent layer of said particles thereon characterized by a porous structure extending to the bottom of said deposited layer, and bonding said particles to each other and to electrode surface by depositing within said pores a bonding metal, the bonding thickness of which being at least no greater than the overall thickness of the deposit, the bonding metal being softer than the abrasive material, whereby the bonding metal may locally recede through wear while firmly supporting the abrasive particles at the abrading surface.

13. A method for fabricating a precision-dimensioned abrasive article which comprises providing an anhydrous organic non-conductive solution containing a substantially uniform dispersion of a mixture of electrically charged abrasive particles and a reducible metal compound, immersing a pair of electrodes in said solution, the surface of one of said electrodes being precision formed and adapted to receive a deposit of said mixture of charged particles thereon, establishing an electrostatic field between said immersed electrodes thereby causing said charged particles to migrate electrophoretically through said non-conductive solution to said precision formed electrode surface to form an adherent co-deposited layer of said mixture of particles thereon characterized by a substantially uniform thickness over and conforming to said precision surface, and subjecting said co-deposited layer to heat treatment at an elevated temperature in a controlled atmosphere reducing to said metal compound thereby forming a metal bond surrounding said abrasive particles, the temperature of heat treatment being sufficient to cause said reduced metal to sinter together, shrink and recede from the upper surface of said layer of abrasive particles thereby leaving the abrasive surface exposed.

14. A method for fabricating a precision-dimensioned abrasive article which comprises providing an anhydrous organic non-conductive solution containing a substantially uniform dispersion of electrically charged abrasive particles, immersing a pair of electrodes in said solution, the surface of one of said electrodes being precision contoured and adapted to receive a deposit of said particles thereon, establishing an electrostatic field between said immersed electrodes thereby causing said charged particles to migrate electrophoretically through said non-conductive solution to said precision contoured electrode surface to form a thin adherent layer of said particles thereon characterized by a porous structure extending to the bottom of said deposited layer and laterally bonding said particles to each other and to the electrode surface by the deposition of metal within the pores by chemical reduction, the bonding thickness being at least no greater than the overall thickness of the abrasive layer.

15. A method for fabricating an abrasive structure with a precision-contoured metal substrate which comprises providing an anhydrous organic non-conductive solution containing a substantially uniform dispersion of electrically charged abrasive particles, immersing a pair of electrodes in said solution, one of said electrodes comprising said precision-contoured substrate, establishing an electrostatic field between said immersed electrodes thereby causing said charged particles to migrate electrophoretically through said non-conductive solution to the surface of said precision-contoured substrate to form an adherent layer of said particles thereon characterized by a porous structure extending to the bottom of said deposited layer, and bonding said particles to each other and to said substrate by depositing within said pores and to the surface of said substrate a bonding metal, whereby said layer of particles is firmly anchored to the substrate surface and projects externally therefrom for abrasive action.

16. The method of claim 15, wherein the final article is subjected to heating at an elevated temperature to form a strongly bonded deposit characterized by a stress-free structure.

17. A method for fabricating a precision-dimensioned abrasive article which comprises providing an anhydrous organic non-conductive solution containing a substantially uniform dispersion of a mixture of electrically charged particles of an abrasive and a metal oxide, immersing a pair of electrodes in said solution, the surface of one of said electrodes being precision-contoured and adapted to receive a deposit of said mixture of charged particles thereon, establishing an electrostatic field between said immersed electrodes thereby causing said charged particles to migrate electrophoretically through said non-conductive solution to said precision-contoured electrode surface to form an adherent co-deposited layer of said mixture of particles thereon characterized by a substantially uniform thickness over and conforming to said precision surface, and subjecting said co-deposited layer to heat treatment at an elevated temperature in a controlled atmosphere reducing to said metal oxide thereby forming a metal bond surrounding said abrasive particles, the temperature of heat treatment being sufficient to cause said reduced metal to sinter together, shrink and recede from the upper surface of said layer of said abrasive particles thereby leaving the abrasive surface exposed.

18. The method of claim 17, wherein the abrasive particles comprise alumina and the metal oxide comprises nickel oxide.

19. The precision-dimensioned abrasive article produced in accordance with the method of claim 11.

References Cited in the file of this patent

UNITED STATES PATENTS

| | | |
|---|---|---|
| Re. 12,567 | Case | Nov. 27, 1906 |
| Re. 22,419 | Smyser | Jan. 11, 1944 |
| 604,569 | Ringstrom | May 24, 1898 |
| 2,020,117 | Johnston | Nov. 5, 1935 |
| 2,143,636 | Tone | Jan. 10, 1939 |
| 2,353,404 | Keeloric | July 11, 1944 |
| 2,562,587 | Swearingen | July 31, 1951 |
| 2,708,726 | Atherton | May 17, 1955 |
| 2,711,390 | Childers et al. | June 21, 1955 |

FOREIGN PATENTS

| | | |
|---|---|---|
| 691,859 | Great Britain | May 20, 1953 |
| 1,044,212 | France | June 17, 1953 |